(12) United States Patent
Sox (10) Patent No.: US 11,747,481 B2
(45) Date of Patent: Sep. 5, 2023

(54) HIGH PERFORMANCE THREE DIMENSIONAL LIGHT DETECTION AND RANGING (LIDAR) SYSTEM FOR DRONE OBSTACLE AVOIDANCE

(71) Applicant: The Boeing Company, Chicago, IL (US)

(72) Inventor: Daniel J. Sox, Saint Charles, MO (US)

(73) Assignee: THE BOEING COMPANY, Chicago, IL (US)

(*) Notice: Subject to any disclaimer, the term of this patent is extended or adjusted under 35 U.S.C. 154(b) by 998 days.

(21) Appl. No.: 16/041,226

(22) Filed: Jul. 20, 2018

(65) Prior Publication Data
US 2021/0318445 A1    Oct. 14, 2021

(51) Int. Cl.
| | | |
|---|---|---|
| G01S 17/933 | (2020.01) | |
| G01S 17/86 | (2020.01) | |
| G01S 17/42 | (2006.01) | |
| G01S 7/481 | (2006.01) | |
| B64C 39/02 | (2023.01) | |
| G08G 5/04 | (2006.01) | |
| G08G 5/00 | (2006.01) | |
| B64D 47/08 | (2006.01) | |

(Continued)

(52) U.S. Cl.
CPC .......... G01S 17/933 (2013.01); B64C 39/024 (2013.01); B64D 47/08 (2013.01); G01S 7/4817 (2013.01); G01S 17/42 (2013.01); G01S 17/86 (2020.01); G08G 5/0069 (2013.01); G08G 5/045 (2013.01); B64U 10/25 (2023.01); B64U 2101/30 (2023.01); G01S 17/931 (2020.01)

(58) Field of Classification Search
CPC ...... G01S 17/933; G01S 17/86; G01S 7/4817; G01S 17/931; B64C 39/024; B64D 47/08; B60R 2300/301
See application file for complete search history.

(56) References Cited

U.S. PATENT DOCUMENTS

| | | | | |
|---|---|---|---|---|
| 5,054,917 A | * | 10/1991 | Pepin | F41G 3/326 356/252 |
| 2004/0178945 A1 | * | 9/2004 | Buchanan | G08G 1/167 342/55 |

(Continued)

OTHER PUBLICATIONS

Scott Davis, Electro-optic steering of a laser beam, 2011, SPIE, Whole Document (Year: 2011).*

*Primary Examiner* — Christian Chace
*Assistant Examiner* — Shayne M. Gilbertson
(74) *Attorney, Agent, or Firm* — GATES & COOPER LLP (57) ABSTRACT

A 3D LIDAR obstacle avoidance system comprising a camera; a data processor; and a gimbaled laser ranging system. The gimbaled laser ranging system is bore sighted to the camera's optical axis and has its rotation axes centered on the camera focal plane (see the attached drawing). Two-dimensional information of the camera is converted to 3-dimensional information by selectively ranging scene objects of interest (i.e. moving targets). Selected object ranges are queried simply by commanding the gimbal to point to the angle in the scene represented by the object's location in the focal plane. By not sampling the entire scene, significant improvements in throughput and range are achieved. Sensor operation in inclement weather is possible by using an IR camera and a longer wavelength ranging-laser.

20 Claims, 8 Drawing Sheets

(51) Int. Cl.
    *G01S 17/931*     (2020.01)
    *B64U 10/25*     (2023.01)
    *B64U 101/30*     (2023.01)

(56) References Cited

U.S. PATENT DOCUMENTS

| | | | |
|---|---|---|---|
| 2016/0267679 A1* | 9/2016 | Maryfield | G02B 23/105 |
| 2018/0352144 A1* | 12/2018 | Miao | G06F 18/241 |
| 2019/0018416 A1* | 1/2019 | Gassend | G01S 17/931 |
| 2019/0052844 A1* | 2/2019 | Droz | H04N 23/60 |
| 2019/0063881 A1* | 2/2019 | Abramov | B64C 39/024 |
| 2019/0066320 A1* | 2/2019 | Uyeno | G06T 7/50 |
| 2019/0180502 A1* | 6/2019 | Englard | G01S 7/417 |
| 2019/0227175 A1* | 7/2019 | Steinberg | G01S 7/483 |
| 2020/0142039 A1* | 5/2020 | Liu | G01S 17/10 |
| 2020/0218288 A1* | 7/2020 | Johnson | B64U 10/13 |

\* cited by examiner

HIGH PERFORMANCE THREE DIMENSIONAL LIGHT DETECTION AND RANGING (LIDAR) SYSTEM FOR DRONE OBSTACLE AVOIDANCE

BACKGROUND

1. Field

The present disclosure relates to a LIDAR system.

2. Description of the Related Art

Conventional LIDAR systems are either laser scanning systems or flash Light Detection and Ranging (LIDAR) systems. LIDAR laser scanning systems function by scanning a scene with a pulsed laser. The receiver has knowledge of when the pulse was transmitted and the direction of the pulse and can therefore build a three dimensional (3D) map (direction and range) of the scene. However, this is inefficient in that every point in the scene must be scanned whether the points are relevant or not. Moreover, significant computation time is needed to build 3D maps, limiting time available for responding to obstacles. In addition, angular resolution is limited by the scan rate, which can limit imaging of complex and/or closer scenes that require very high scan speeds.

Flash LIDAR systems use specially configured cameras, processing/control chips and transmitters to capture 3D information at video rates. Flash LIDAR systems operate by illuminating the entire scene with coded laser pulses, then decoding the laser pulses on a pixel-by-pixel basis using the specially configured camera and processing chips. Because the entire scene must be illuminated by the laser directly, these LIDAR systems are limited to short range applications and relatively low spatial resolutions (typically 320×240).

What is needed then, is a LIDAR system that can range more complex scenes in a more computationally efficient manner. The present disclosure satisfies this need.

SUMMARY

The present disclosure describes an apparatus, comprising a camera; a processor connected to the camera and identifying an area of interest in an image of a scene captured by the camera; and a laser ranging system connected to the processor. The processor controls the laser ranging system so that the laser ranging system selectively measures a distance to an object of interest in the scene and corresponding to the area of interest in the image.

The apparatus can be embodied in many ways including, but not limited to, the following examples.

1. The apparatus wherein the object of interest includes a moving object or an obstacle.

2. The apparatus of any of the previous embodiments, wherein the processor controls the laser ranging system so as to only measure the distance to the object of interest comprising a moving object and/or an obstacle.

3. The apparatus of one or any combination of the previous embodiments wherein the laser ranging system only measures one or more distances to one or more positions in the scene corresponding to the area of interest covering less than 5%, less than 25%, or less than 50% of an area of the image or a focal plane of the camera.

4. The apparatus of one or any combination of the previous embodiments, wherein the laser ranging system only measures distances to a subset of positions in the scene.

5. The apparatus of one or any combination of the previous embodiments, wherein the laser ranging system comprises a gimbaled laser ranging system including a laser transmitter bore sighted to the camera's optical axis, and the laser ranging system includes the laser transmitter mounted on a gimbal having rotation axes centered on the camera's focal plane.

6. The apparatus of one or any combination of the previous embodiments, wherein: the laser ranging system comprises a laser transmitter mounted on a steerer, the steerer directs a laser beam emitted from the laser transmitter to the object of interest associated with the area of interest, and the steerer comprises a non-mechanical beam steerer.

7. The apparatus of one or any combination of the previous embodiments, wherein the laser ranging system comprises a laser transmitter mounted on an electro-optical beam steerer, and the steerer directs a laser beam emitted from the laser transmitter to the object of interest associated with the area of interest.

8. The apparatus of one or any combination of the previous embodiments, wherein the processor converts 2-dimensional image information of the image to 3-dimensional information including the information in the image and the distance to the object of interest.

9. The apparatus of one or any combination of the previous embodiments, wherein the camera includes pixels on which the image is formed; the laser ranging system includes a laser emitting a laser beam and a receiver; the receiver detects the laser beam after the laser beam has reflected off the object of interest; the processor measures time of flight of the laser beam from the laser to the receiver via the object of interest; and the laser beam has a divergence no larger than each pixel's instantaneous field of view.

14. An aircraft (e.g., drone) or automobile comprising the apparatus of one or any combination of the previous embodiments.

15. The aircraft or automobile of example 14 connected to a navigation system, wherein the area of interest includes a portion of the image representing an obstacle in the scene, the distance comprises a distance to the obstacle, the processor transmits the distance to the obstacle to the navigation system, and the navigation system uses the distance to the obstacle to control the aircraft's propulsion system and/or flight control system so that the aircraft avoids the obstacle.

The present disclosure further describes a method of operating a LIDAR system, comprising imaging a scene using camera, forming an image; transmitting the image to a processor, wherein the processor identifies an area of interest in the image; controlling a laser ranging system so that the laser ranging system selectively measures one or more distances to one or more positions in the scene corresponding to the area of interest in the image.

The present disclosure further describes a method of operating an aircraft or automobile, comprising: imaging a scene in a vicinity of an aircraft using a camera, forming an image; transmitting the image to a processor, wherein the processor identifies an obstacle in the image; controlling the laser ranging system so as that the laser ranging system selectively measures a distance to the obstacle in the scene; and transmitting the distance to the obstacle to a navigation system, wherein the navigation system uses the distance to the obstacle to control the aircraft's propulsion system and/or flight control system so that the aircraft avoids the obstacle.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Example LIDAR System

Figure 1A:
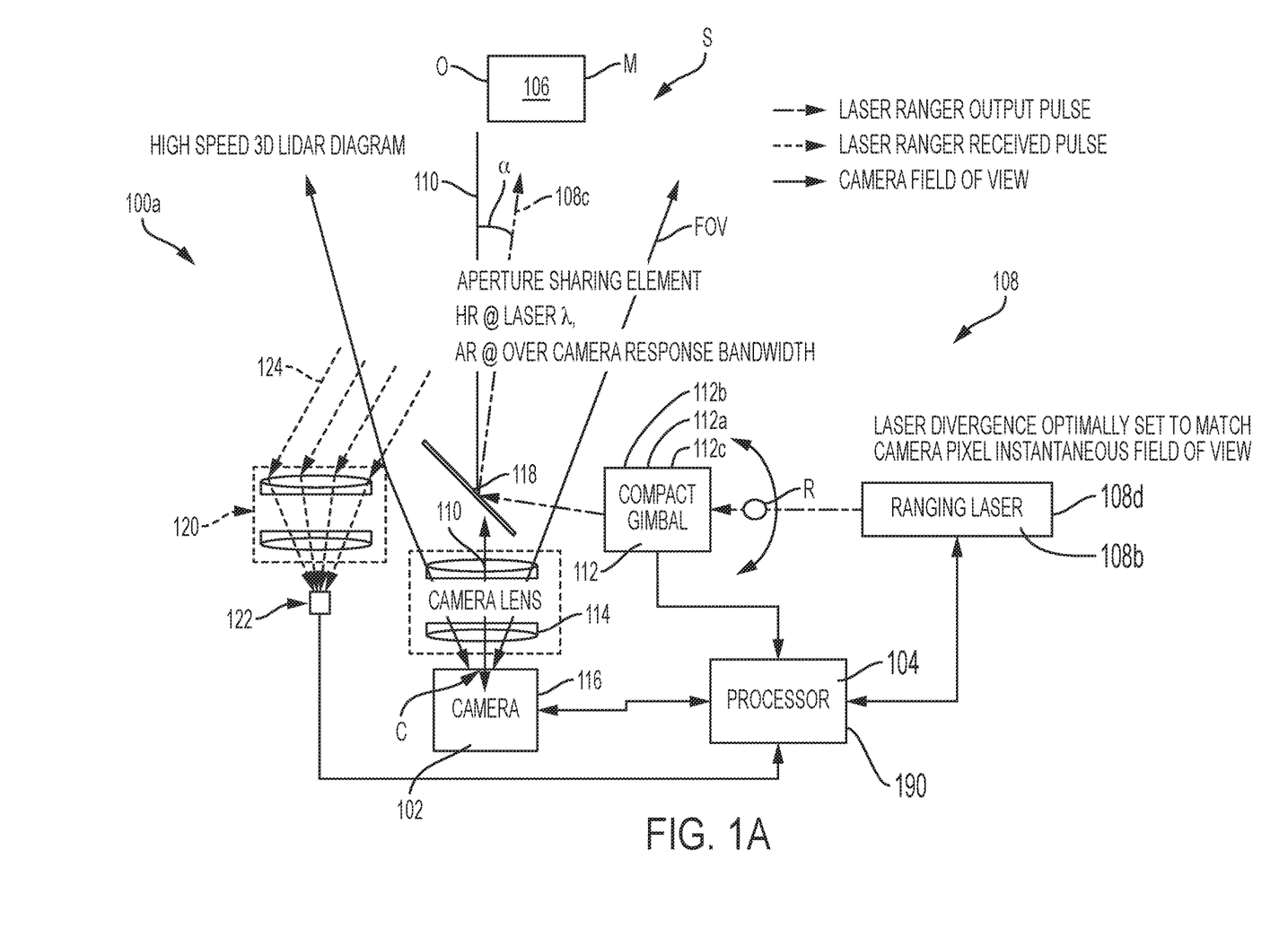
FIG. 1A illustrates a high speed LIDAR ranging system according to one or more embodiments.

FIG. 1A illustrates a high speed 3D LIDAR system 100*a* according to one or more embodiments.

The system 100*a* includes a camera 102 (e.g., a visible or infrared (IR) camera) used in conjunction with a processor 104 to detect and classify the various objects of interest 106 in the camera's field of view (FOV). A laser ranger 108 comprises a laser 108*b* (transmitter) bore-sighted to the camera's optical axis 110. A laser beam 108*c* emitted from the laser 108*b* is used to determine the range and/or speed of the objects of interest 106.

FIG. 1A further illustrates a compact high-speed gimbal 112, preferably a non-mechanical beam steerer (112*b*), controlled by the processor 104. The gimbal 112 directs the laser 108*b* so that the laser beam 108*c* points to range the objects of interest 106.

Figure 1B:
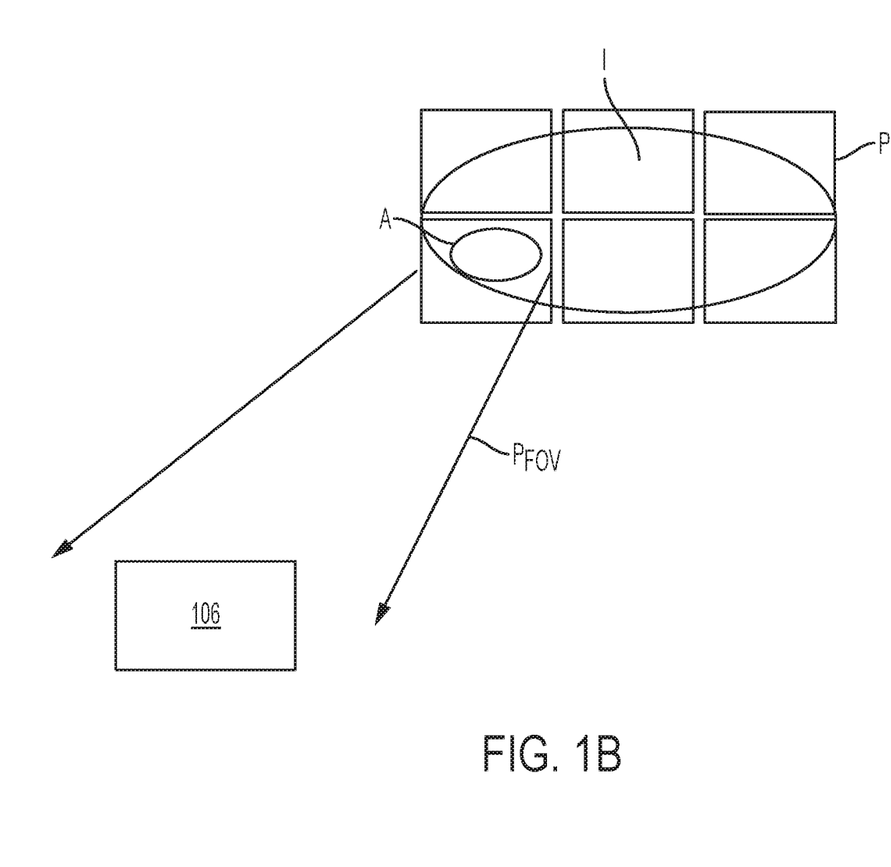
FIG. 1B illustrates formation of an image on camera pixels according to one or more embodiments.

FIG. 1A further illustrates the LIDAR system includes camera lens(es) 114 for focusing the scene S onto the camera's focal plane 116. FIG. 1B illustrates an example wherein the camera 102 includes pixels P and the image I of the scene S is formed on the pixels P located on the focal plane 116. Each pixel has a field of view $P_{FOV}$ and an area of interest A in the image, representing the portion of the image corresponding to/associated with the objects of interest 106, is formed on a subset of the pixels P.

The LIDAR system 100*a* further includes a scanning mirror or beamsplitter 118 directing the laser beam 108*c* to range the object(s) of interest 106. The beamsplitter 118 can be fixed or mounted on a scanner (e.g., on a non-mechanical beam steerer). In one or more examples wherein the gimbal 112 is a high speed non-mechanical beam steerer having a much smaller FOV along one axis, it may be desirable to scan the beam splitter so as to overcome the problem of the smaller FOV along one axis.

In one or more examples, the beamsplitter 118 has a reflective coating for reflecting the wavelength(s) of the laser beam 108*c* towards the object of interest 106 and an anti-reflective coating for wavelengths corresponding to the camera response bandwidth.

FIG. 1A further illustrates the LIDAR system 100*a* includes collection optics 120 and a receiver 122 for receiving the reflection 124 of the laser beam emitted from the laser in the LIDAR ranging system. In one or more examples, the receiver 122 and collection optics 120 are combined with the lenses 114 and camera 102.

In one or more examples, each object of interest 106 is ranged sequentially (with priority given to closer and/or faster moving objects) based on the object of interest's 106 location in the camera's focal plane 106. The gimbal's 112 pointing commands can be derived via a simple lookup of angle versus pixel position. Thus, only objects of interest 106 are ranged such that the entire 3D camera field of view volume is not interrogated by the ranging laser 108*b*. This implementation enables lower average laser power requirements and faster updates of moving objects in the field of view (i.e. more time for avoidance decision making). In one example, approximately 200 objects were tracked and ranged every 10 milliseconds using a Vescent Photonics non-mechanical beam steerer (5×30 degree field of view, 50 microsecond steering time) and a 100 Hz frame rate camera.

Signal (laser beam 108*c*) power can be optimized depending on the ranges to the object(s) of interest 106, by running the camera 102 at high frame rates for closer objects or much slower frame rates for distant objects.

Example Obstacle Avoidance System

Obstacle detection and avoidance is an ongoing problem for drone/aircraft operation in congested air space, particularly as drone performance increases. A 3D LIDAR according to embodiments described herein is capable of high-speed detection and avoidance of such obstacles and overcomes the weaknesses exhibited by conventional 3D LIDAR (and RADAR) sensor systems.

Figure 2A:
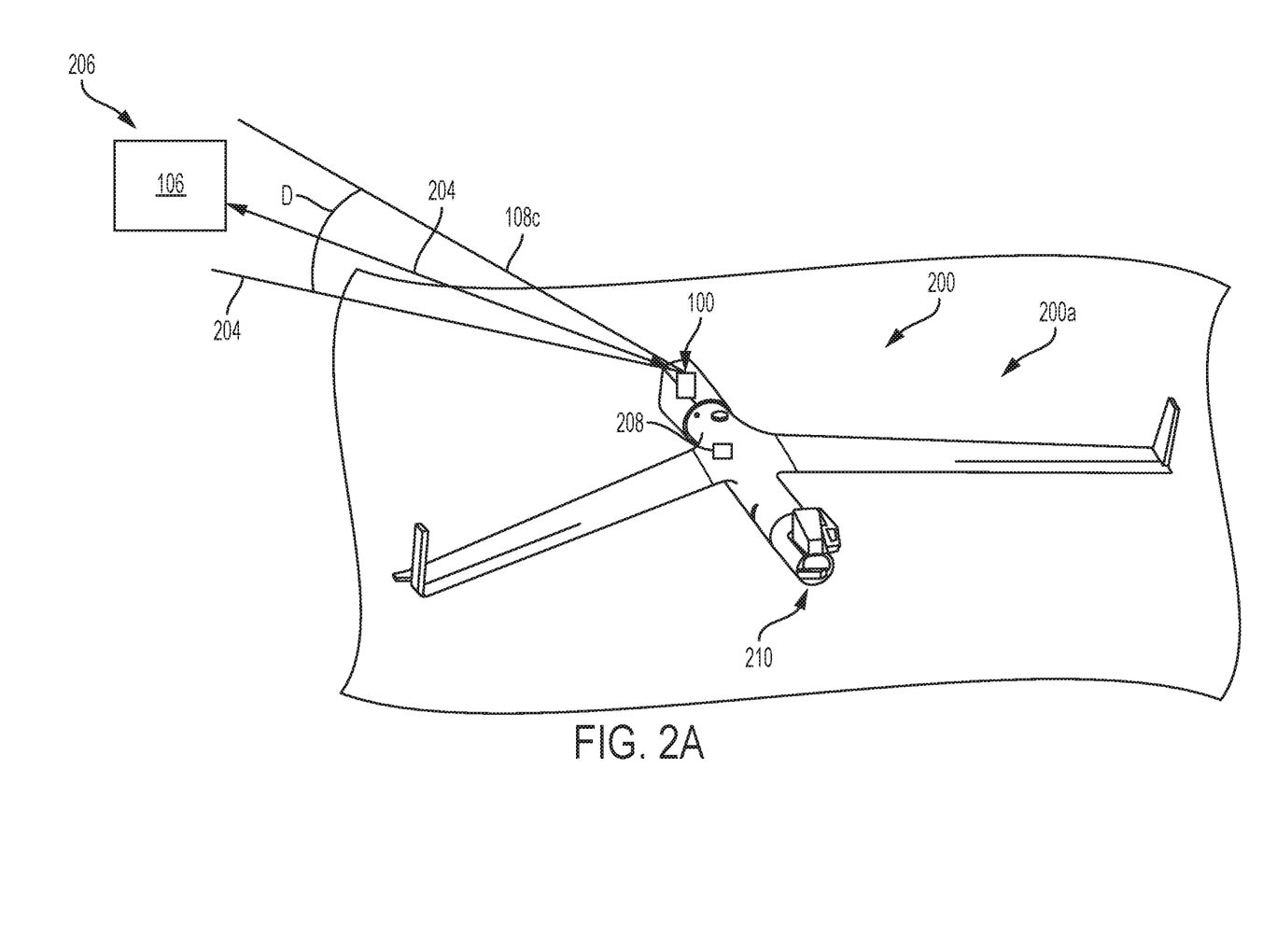
FIG. 2A illustrates an aircraft including the high speed LIDAR ranging system according to one or more embodiments.

FIG. 2A illustrates an aircraft 200 (e.g., drone 200*a*) comprising a LIDAR apparatus (100*b*) (e.g., as illustrated in FIG. 1A). As illustrated herein, the apparatus (100*b*) includes camera having a focal plane; a processor connected to the camera and identifying an area of interest in an image of a scene captured by the camera; and a laser ranging system connected to the processor. The processor controls the laser ranging system so that the laser ranging system selectively measures one or more distances 204 to one or more positions 206 in the scene S corresponding to/associated with the area of interest A in the image I.

FIG. 2 further illustrates how, for long-range operation, the laser ranger 108 is optimized so that the laser beam 108*c* has a divergence D no larger than each camera pixel's P instantaneous field of view $P_{FOV}$.

FIG. 2A further illustrates the aircraft connected to a navigation system 208 wherein the area of interest A includes the portion of an image corresponding to/associated with an obstacle (O) in the scene, the one or more distances 204 comprise a distance to the obstacle (O) in the scene, the processor 104 transmits the distance 204 to the obstacle (O) to the navigation system 208. The navigation system 208 uses the distance 204 to the obstacle (O) to control the aircraft's propulsion and flight control system 210 so that the aircraft 200 avoids the obstacle (O).

Figure 2B:
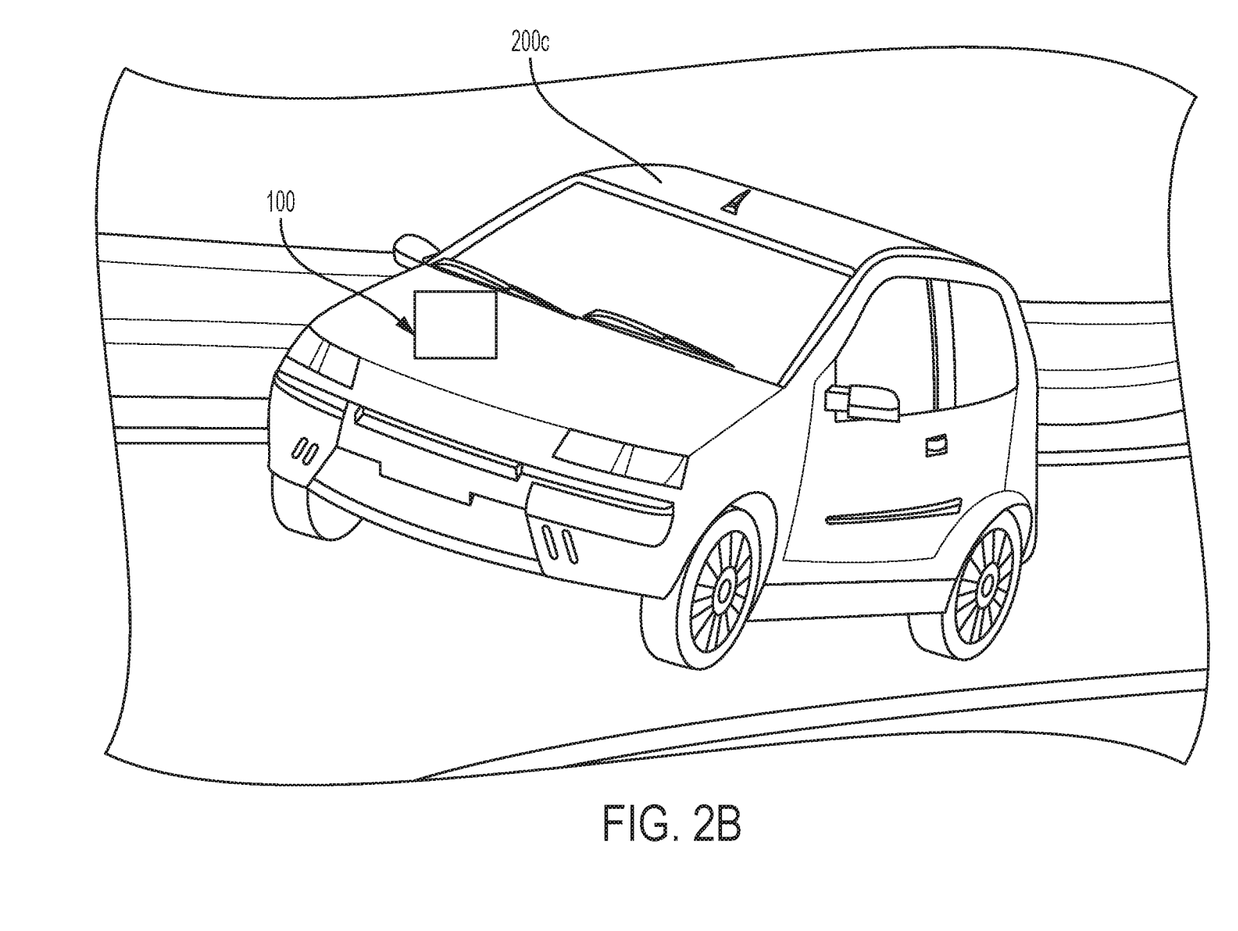
FIG. 2B illustrates an car including the high speed LIDAR ranging system according to one or more embodiments.

FIG. 2B illustrates the obstacle (O) avoidance system can also be implemented in a vehicle such as a car.

Process Steps

Fabrication

Figure 3:
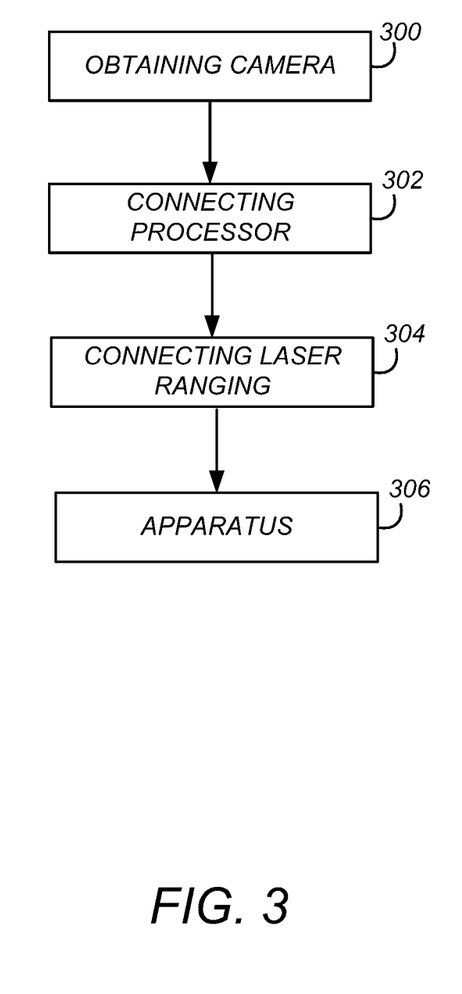
FIG. 3 is a flowchart illustrating a method of making a LIDAR ranging system according to one or more embodiments.

FIG. 3 is a flowchart illustrating a method of making an apparatus (100*b*). The method includes the following steps.

Block 300 represents obtaining a camera having a focal plane and an optical axis.

Block 302 represents connecting a processor to the camera, wherein the processor is capable of identifying one or more areas of interest in an image of a scene captured by the camera (as described herein, the area(s) of interest are the portion(s) of the image corresponding to/associated with one or more objects of interest in the scene).

Block 304 represents connecting a laser ranging system to the processor and the camera.

The laser ranging system includes a laser transmitter 108d (preferably emitting an eye safe power and/or wavelength) and a receiver. The laser transmitter is mounted on a steering mechanism/steerer for steering/directing the laser beam emitted from the transmitter towards the object of interest. Examples of steering mechanism/steerer include, but are not limited to, a gimbal, a mechanical steerer, and a non-mechanical beam steerer 112b (e.g., electro-optic steerer (112c) or steerer comprising liquid crystals). In various examples, the steerer is capable of continuous and/or digital steering (e.g., steering the laser beam at discrete angles).

In one or more examples, the laser ranging system comprises a gimbaled laser ranging system and the gimbal 112 in the ranging system is configured such that the laser 108b is bore sighted to the camera's optical axis 110 and the gimbal 112 has rotation axes R centered on the camera's focal plane 116. In one or more examples, the laser divergence is optimally set to match the camera pixel instantaneous field of view. In one or more examples, the divergence D of the laser beam is set to so that the laser beam 108c can cover/illuminate the field of view $P_{FOV}$ of one pixel P on the camera's sensor or sensing device (e.g., a charge coupled device (CCD) or complementary metal-oxide semiconductor sensor).

In one or more examples, it is desirable to implement separate apertures for the laser ranging receiver 122 and the camera 102 so as to maximize the range of the laser ranger (in this case, no received light is lost in the shared aperture element and the receiver aperture can be optimized). However, in other examples, field of view considerations (particularly at close range) render it desirable for the laser ranger 108 to share an optical system with the camera 102.

Block 306 represents the end result, an apparatus 100b wherein the processor 104 controls the laser ranging system 100a so that the laser ranging system 100a selectively measures one or more distances 204 to one or more positions 206 in the scene S corresponding to/associated with/represented by/imaged by the area of interest A in the image I. Specifically, the laser ranging system only measures distances to a subset of positions 206 in the scene. In one or more examples, the area of interest corresponds/represents/comprises an image of a moving object (M), an obstacle (O), or target and the processor controls the laser ranging system 100a so that the laser ranging system only measures one or more distances 204 to the moving object(s) of interest or obstacle(s). In one or more examples, the processor 104 controls the laser ranging system so that the laser ranging system only measures one or more distances 204 to one or more positions 206 in the scene corresponding to the area of interest A covering less than 50%, less than 25%, or less than 5% of a total area of the image I or a focal plane 116 of the camera 102.

In one or more examples, the processor converts 2-dimensional image information of the image to 3-dimensional information (190) including the information in the image and the one or more distances 204 to the one or more positions 206 in the scene.

The processor 104 may further include electronics used to synchronize the laser ranging timing with the correct camera frame. The processor 104 may also control the power of the laser beam 108c depending on the distance 204 to the object of interest 106.

The LIDAR system according to embodiments described herein is not limited to operation in the visible spectrum using cameras imaging at visible wavelengths. An IR or thermal camera can be used for night operations or operations during fog or inclement weather. Similarly, a long wavelength laser ranger (e.g., laser transmitter emitting RADAR wavelengths) can be used, e.g., in inclement or foggy weather for better performance. Ultraviolet cameras and laser ranging can also be used.

Laser ranging can use pulse timing or continuous wave laser beams. Furthermore, Doppler (and micro-Doppler) LIDAR can be used in conjunction with pulsed laser ranging for high-speed direct object speed measurements.

Laser ranging only the objects of interest requires less average laser power. This means that the effective range of the sensor/laser ranging system can be extended by increasing the ranging laser's 108v peak pulse power. In addition, for the same performance, a smaller laser can be used and the sensor's/camera's power draw and footprint can be reduced.

In one or more examples, camera image processing for object detection/classification and object ranging can be done in parallel, as can the chosen object avoidance algorithm.

Operation

Figure 4:
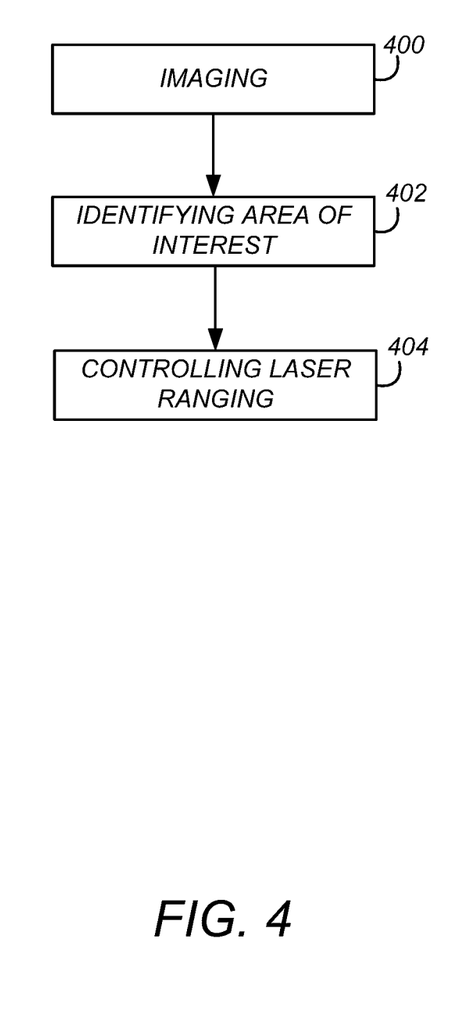
FIG. 4 is a flowchart illustrating a method of operating a LIDAR ranging system according to one or more embodiments.

FIG. 4 is a flowchart illustrating a method of operating a LIDAR system (referring also to FIG. 1A, FIG. 1B, and FIG. 2).

Block 400 represents imaging a scene using camera (102), forming an image.

Block 402 represents transmitting the image to a processor, wherein the processor queries objects in the image and identifies those objects that are of interest (e.g., moving objects, obstacles). In one or more examples, the processor identifies an area of interest on one or more pixels in the image (corresponding to the objects of interest) and maps the pixels associated with the area of interest to an array of angles α (referring to FIG. 1A) with respect to the camera's optical axis 110.

Block 404 represents using the processor to control a laser ranging system. The controlling is such that the laser ranging system selectively measures one or more distances to one or more positions in the scene corresponding to the area of interest in the image. In one or more examples, bore sighting the laser ranging system to the camera's optical axis and mounting the laser transmitter to a gimbal 112 having rotation axes R centered on the camera's focal plane 116 enables the laser beam 108c to be aimed/pointed at the center C of the camera but in different directions (defined by the angles α corresponding to the different positions of the objects of interest in the scene). More specifically, the processor controls the gimbal or steerer so as to point the laser beam 108c at the angle(s) a in the array corresponding to the pixels P associated with the objects of interest 106. In one or more examples, each pixel has a field of view $P_{FOV}$ covering an angle 220 in a range of 5-20 arcseconds (e.g., 10 arcseconds).

In one or more examples, the camera is operated at high speeds (e.g., with a kHz frame rate) and the laser beam is steered with a 5 microsecond latency, as might be needed in particular applications such as obstacle avoidance or object tracking. Thus, the distances 204 measured by the laser ranging system 100a can be used to track a target or for obstacle avoidance, for example.

Aircraft or Automobile Operation

Figure 5:
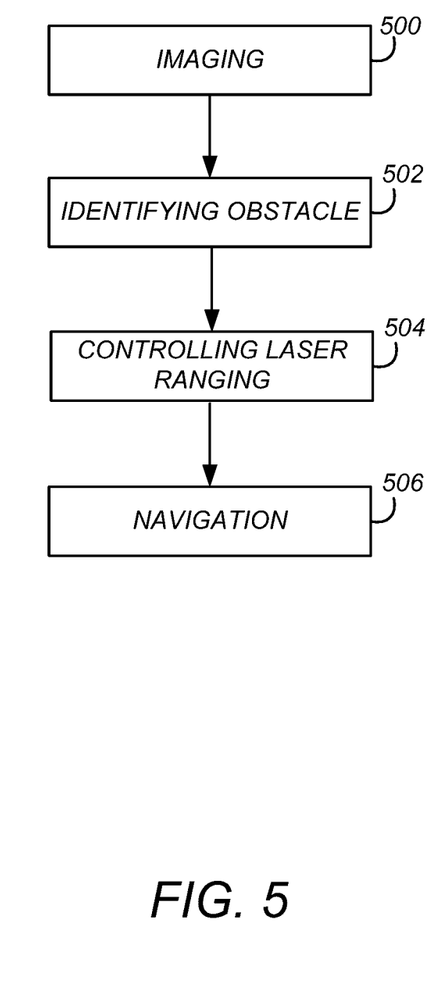
FIG. 5 is a flowchart illustrating a method of operating an aircraft according to one or more embodiments.

FIG. 5 is a flowchart illustrating a method of operating an aircraft or vehicle such as, but not limited to, a drone, a commercial airplane, or automobile (car).

Block 500 represents imaging a scene in a vicinity of the vehicle using a camera (102), forming an image.

Block 502 represents transmitting the image to a processor, wherein the processor identifies an obstacle in the image.

Block 504 represents using the processor to control the laser ranging system 100a so that the laser ranging system 100a selectively measure a distance 204 to a position 206 in the scene S corresponding to the obstacle.

Block 506 represents transmitting the distance to the obstacle to a navigation system 208. The navigation system 208 uses the distance 204 to the obstacle to control the vehicle's propulsion and/or flight control system so that the vehicle avoids the obstacle.

Processing Environment

Figure 6:
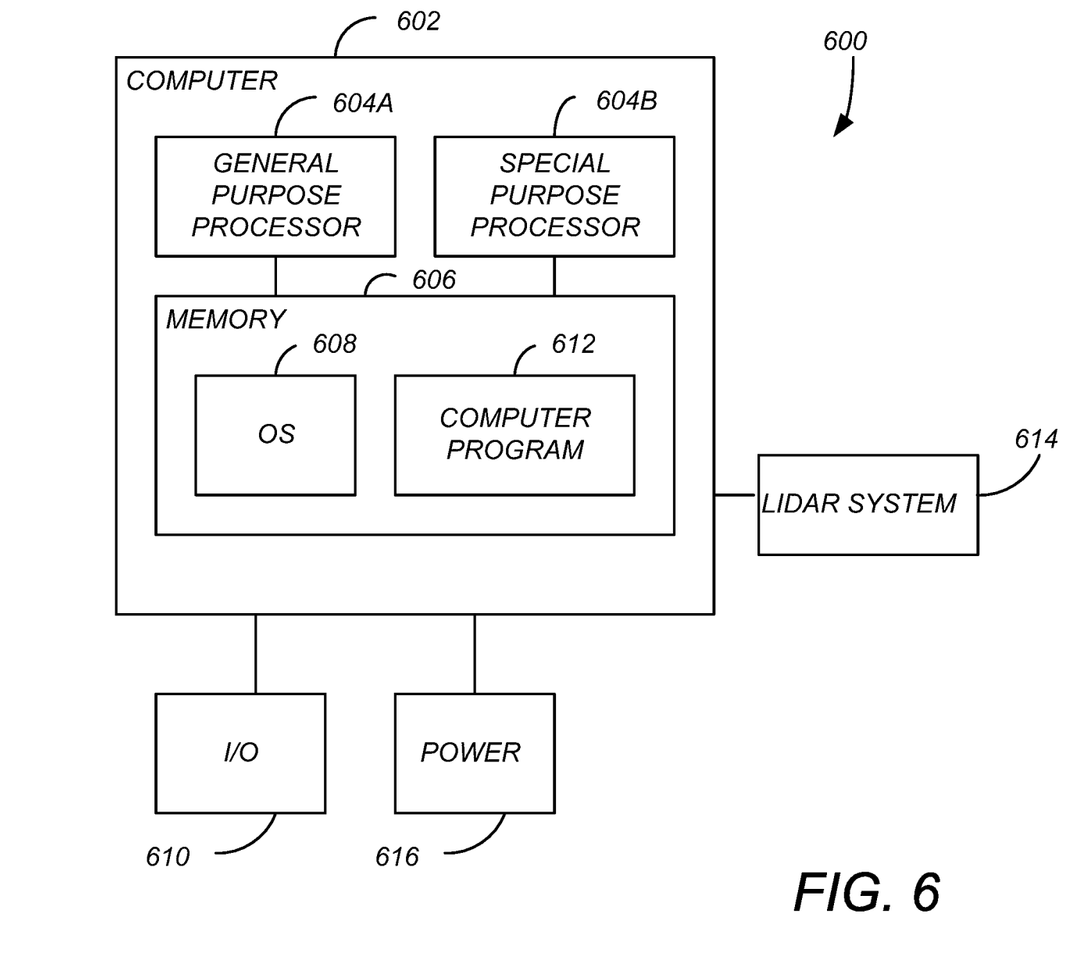
FIG. 6 illustrates an exemplary hardware environment for implementing processing functions described herein.

FIG. 6 illustrates an exemplary system 600 used to implement processing elements needed to control the LIDAR system and identify objects of interest as described herein. In other examples, the system 600 is a flight control system used to control the vehicle so as to avoid obstacles as described herein.

The computer 602 comprises a processor 604 (general purpose processor 604A and special purpose processor 604B) and a memory, such as random access memory (RAM) 606. Generally, the computer 602 operates under control of an operating system 608 stored in the memory 606, and interfaces with the user/other computers to accept inputs and commands (e.g., analog or digital signals from the crew or LIDAR system) and to present results through an input/output (I/O) module 610. The computer program application 612 accesses and manipulates data stored in the memory 606 of the computer 602. The operating system 608 and the computer program 612 are comprised of instructions which, when read and executed by the computer 602, cause the computer 602 to perform the operations and/or methods herein described. In one embodiment, instructions implementing the operating system 608 and the computer program 612 are tangibly embodied in the memory 606, thereby making one or more computer program products or articles of manufacture capable of controlling the LIDAR, identifying objects of interest in images, combining image and ranging data, and/or controlling the vehicle to avoid obstacles as described herein. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus, comprising:
    a camera comprising pixels located on a focal plane;
    a processor connected to the camera and programmable to identify one or more areas of interest in an image of a scene when the image is captured by the camera; and
    a laser ranging system connected to the processor, the laser ranging system comprising a laser rotatably coupled to the camera so that a laser beam outputted from the laser can be pointed in different directions corresponding to positions of each of a plurality of objects of interest in the scene; wherein:
    the processor is programmable to control the laser ranging system so that the laser ranging system selectively measure distances to each of the objects of interest in the scene and corresponding to the areas of interest in the image and so that the objects of interest, comprising different targets in different areas of interest in the image, are ranged sequentially,
    the laser ranging system comprising a gimbaled laser ranging system comprising:
        a gimbal comprising a rotation axis centered on the focal plane, and
        the laser bore sighted to the camera's optical axis.

2. The apparatus of claim 1, wherein at least one of the objects of interest includes a moving object.

3. The apparatus of claim 1, wherein the processor is programmable to control the laser ranging system so as to only measure the distances to the one or more of the objects of interest comprising a moving object and/or an obstacle.

4. The apparatus of claim 1, wherein the objects of interest include an obstacle.

5. The apparatus of claim 1, wherein the laser ranging system only measures the distances to the positions in the scene corresponding to the areas of interest each covering less than 50% of an area of the image or the focal plane of the camera.

6. The apparatus of claim 1, wherein the laser ranging system only measures the distances to the positions in the scene corresponding to the areas of interest each covering less than 25% of an area of the focal plane or the image.

7. The apparatus of claim 1, wherein the laser ranging system only measures the distances to the positions in the scene corresponding to the areas of interest each covering less than 5% of an area of the focal plane or the image.

8. The apparatus of claim 1, wherein the laser ranging system only measures the distances to a subset of positions in the scene.

9. The apparatus of claim 1, wherein:
    the processor is programmable to identify the areas of interest corresponding to the objects of interest on the one or more pixels in the image and map the one or more pixels associated with each of the areas of interest, comprising the different targets, to one of a plurality of angles $\alpha$ with respect to the camera's optical axis, and
    the distances are queried by commanding the gimbal to point the laser beam at each of the plurality of angles with respect to the camera's optical axis representing each of the positions in the focal plane, so that the different targets are at different ones of the angles.

10. The apparatus of claim 1, wherein:

the laser ranging system comprises the laser mounted on the gimbal comprising a steerer or the laser ranging system further comprises a scanning mirror or beam splitter mounted on the steerer, the steerer directs the laser beam emitted from the laser to the one of the objects of interest associated with the area of interest, and the steerer comprises a non-mechanical beam steerer.

11. The apparatus of claim 1, wherein:

the laser ranging system comprises the laser mounted on the gimbal comprising an electro-optical beam steerer or the laser ranging system further comprises a scanning mirror or beam splitter mounted on the steerer, and the steerer directs the laser beam emitted from the laser to the objects of interest, and the apparatus further comprises at least one of:

the steerer capable of being steered with at most as 50 microsecond steering time, the steerer capable of being steered with at most a 5 microsecond latency, the pixels each having a field of view $P_{FOV}$ covering an angle in a range of 5-20 arcseconds, or the beam splitter comprising a smaller field of view along one axis and the beam splitter capable of being scanned so as to overcome the smaller field of the view along one axis.

12. The apparatus of claim 1, wherein the processor is programmable to convert 2-dimensional image information of the image to 3-dimensional information including the information in the image and the distances to the objects of interest.

13. The apparatus of claim 1, wherein:

the camera includes the pixels on which the image is formed;

the laser ranging system includes the laser emitting the laser beam and a receiver;

the receiver detects the laser beam after the laser beam has reflected off the one of the objects of interest;

the processor is programmable to measure time of flight of the laser beam from the laser to the receiver via the one of the objects of interest; and the laser beam has a divergence no larger than each of the pixels' instantaneous field of view.

14. An aircraft or automobile comprising the apparatus of claim 1.

15. The aircraft or automobile of claim 14 connected to a navigation system, wherein:

the areas of interest includes a portion of the image representing the one of the objects of interest comprising an obstacle in the scene, the distances comprise an obstacle distance to the obstacle, the processor is programmable to transmit the obstacle distance to the obstacle to the navigation system, and the navigation system uses the obstacle distance to the obstacle to control:

the aircraft's flight control system so that the aircraft avoids the obstacle, or the automobile's control system so that the automobile avoids the obstacle.

16. The aircraft of claim 15, wherein the aircraft is a drone.

17. A method of operating a LIDAR system, comprising:

imaging a scene using camera comprising pixels on a focal plane, forming an image;

transmitting the image to a processor, wherein the processor identifies areas of interest in the image;

controlling a laser ranging system so that the laser ranging system selectively measures distances to different targets in the scene corresponding to different ones of the areas of interest in the image and wherein the laser ranging system comprises a laser rotatably coupled to the camera so that a laser beam outputted from the laser can be pointed in different directions corresponding to positions of each of the different targets in the scene, and wherein:

the laser ranging system comprises a gimbaled laser ranging system comprising:

a gimbal comprising a rotation axis centered on the focal plane, and the laser bore sighted to the camera's optical axis, and the laser beam is directed using the gimbal having the rotation axis centered on the focal plane.

18. A method of operating a vehicle comprising an aircraft or automobile, comprising:

imaging a scene in a vicinity of a vehicle comprising an aircraft or automobile using a camera comprising pixels on a focal plane, forming an image;

transmitting the image to a processor, wherein the processor identifies an obstacle in the image;

controlling a direction of a laser beam outputted from a laser ranging system, with respect to an optical axis of the camera, so that the laser ranging system selectively measures a distance to the obstacle in the scene; and transmitting the distance to a navigation system, wherein the navigation system uses the distance to control:

the aircraft's flight control system so that the aircraft avoids the obstacle, or the automobile's control system so that the automobile avoids the obstacle, and wherein:

the laser ranging system comprises a gimbaled laser ranging system comprising:

a gimbal comprising a rotation axis centered on the focal plane, and the laser bore sighted to the camera's optical axis, and the laser beam is directed using the gimbal having the rotation axis centered on the focal plane.

19. The method of claim 18, wherein the vehicle comprises the aircraft.

20. The method of claim 18, wherein the vehicle comprises the automobile.

* * * * *

UNITED STATES PATENT AND TRADEMARK OFFICE
CERTIFICATE OF CORRECTION

PATENT NO. : 11,747,481 B2
APPLICATION NO. : 16/041226
DATED : September 5, 2023
INVENTOR(S) : Daniel J. Sox It is certified that error appears in the above-identified patent and that said Letters Patent is hereby corrected as shown below:

In the Claims

Column 8, Line 20 in Claim 1, delete the text "measure" and insert the text --measures--.

Signed and Sealed this
Sixteenth Day of April, 2024

Katherine Kelly Vidal
*Director of the United States Patent and Trademark Office*